(12) United States Patent
Goshima

(10) Patent No.: US 9,023,269 B2
(45) Date of Patent: May 5, 2015

(54) MANUFACTURING METHOD OF RESIN MOLDING MOLD, RESIN MOLDING MOLD, RESIN MOLDING MOLD SET, MANUFACTURING METHOD OF MICROCHIP SUBSTRATE, AND MANUFACTURING METHOD OF MICROCHIP USING SAID MOLD

(75) Inventor: Takehiko Goshima, Kunitachi (JP)

(73) Assignee: Konica Minolta, Inc., Tokyo (JP)

( * ) Notice: Subject to any disclaimer, the term of this patent is extended or adjusted under 35 U.S.C. 154(b) by 67 days.

(21) Appl. No.: 14/004,043

(22) PCT Filed: Feb. 24, 2012

(86) PCT No.: PCT/JP2012/054502
§ 371 (c)(1),
(2), (4) Date: Sep. 9, 2013

(87) PCT Pub. No.: WO2012/124449
PCT Pub. Date: Sep. 20, 2012

(65) Prior Publication Data
US 2013/0341834 A1    Dec. 26, 2013

(30) Foreign Application Priority Data
Mar. 17, 2011    (JP) .................................. 2011-058650

(51) Int. Cl.
*B29C 45/00*    (2006.01)
*B29C 45/14*    (2006.01)
(Continued)

(52) U.S. Cl.
CPC . *B29C 45/14* (2013.01); *C25D 1/10* (2013.01); *B23P 15/24* (2013.01); *B29C 33/42* (2013.01); *B29C 33/56* (2013.01); *B29L 2031/756* (2013.01); *B29C 33/38* (2013.01)

(58) Field of Classification Search
CPC ........ B29C 33/38; B29C 33/42; B29C 33/56; B29C 45/14; B29L 2031/756; C25D 1/10; C25D 1/006; C25D 1/003; G01N 37/00
See application file for complete search history.

(56) References Cited

U.S. PATENT DOCUMENTS

2003/0057096 A1* 3/2003 Morales et al. ................. 205/67
2005/0067286 A1* 3/2005 Ahn et al. ....................... 205/70
(Continued)

FOREIGN PATENT DOCUMENTS

JP    06-128788    5/1994
JP    06-158381    6/1994
(Continued)

OTHER PUBLICATIONS

International Preliminary Report on Patentability and Written Opinion of the International Searching Authority in International Application No. PCT/JP2012/054502 mailed Sep. 17, 2013, with English language translation, 10 pages.
(Continued)

*Primary Examiner* — Jill Heitbrink
(74) *Attorney, Agent, or Firm* — Brinks Gilson & Lione

(57) ABSTRACT

A method for producing a resin molding die (13) for molding a first substrate (2) having a flow path (2b) and a through-hole (2a), wherein a base die (10) having a concave part (10b) corresponding to the flow path (2b) and a through-hole (10a) corresponding to through-hole (2a) and deeper than the concave part (10b) is prepared, the base die (10) is subjected to electroforming with a first material and is then subjected to electroforming with a second material which is different from the first material, and a protruding part for forming through-hole (10a) by removing the first material that was electrodeposited on through-hole (10a) is formed. The first material has a smaller electroforming stress than the second material, the first material exerts a higher adhesiveness with regard to the base die than the second material, and the second material is harder than the first material.

14 Claims, 9 Drawing Sheets

(51) Int. Cl.
 *C25D 1/10* (2006.01)
 *B29C 33/38* (2006.01)
 *B23P 15/24* (2006.01)
 *B29C 33/42* (2006.01)
 *B29C 33/56* (2006.01)
 *B29L 31/00* (2006.01)

(56) References Cited

U.S. PATENT DOCUMENTS

2006/0057245 A1 3/2006 Haupt et al.
2008/0143020 A1 6/2008 Ichikawa et al.
2011/0018171 A1 1/2011 Sekihara

FOREIGN PATENT DOCUMENTS

| JP | 2004-114334 | 4/2004 |
| JP | 2006-6286 A | 1/2006 |
| JP | 2006-509649 A | 3/2006 |
| JP | 2008-137280 A | 6/2008 |
| WO | WO 2009/119441 A1 | 10/2009 |

OTHER PUBLICATIONS

International Search Report in International Application No. PCT/JP2012/054502 mailed May 22, 2012, 2 pages.

* cited by examiner

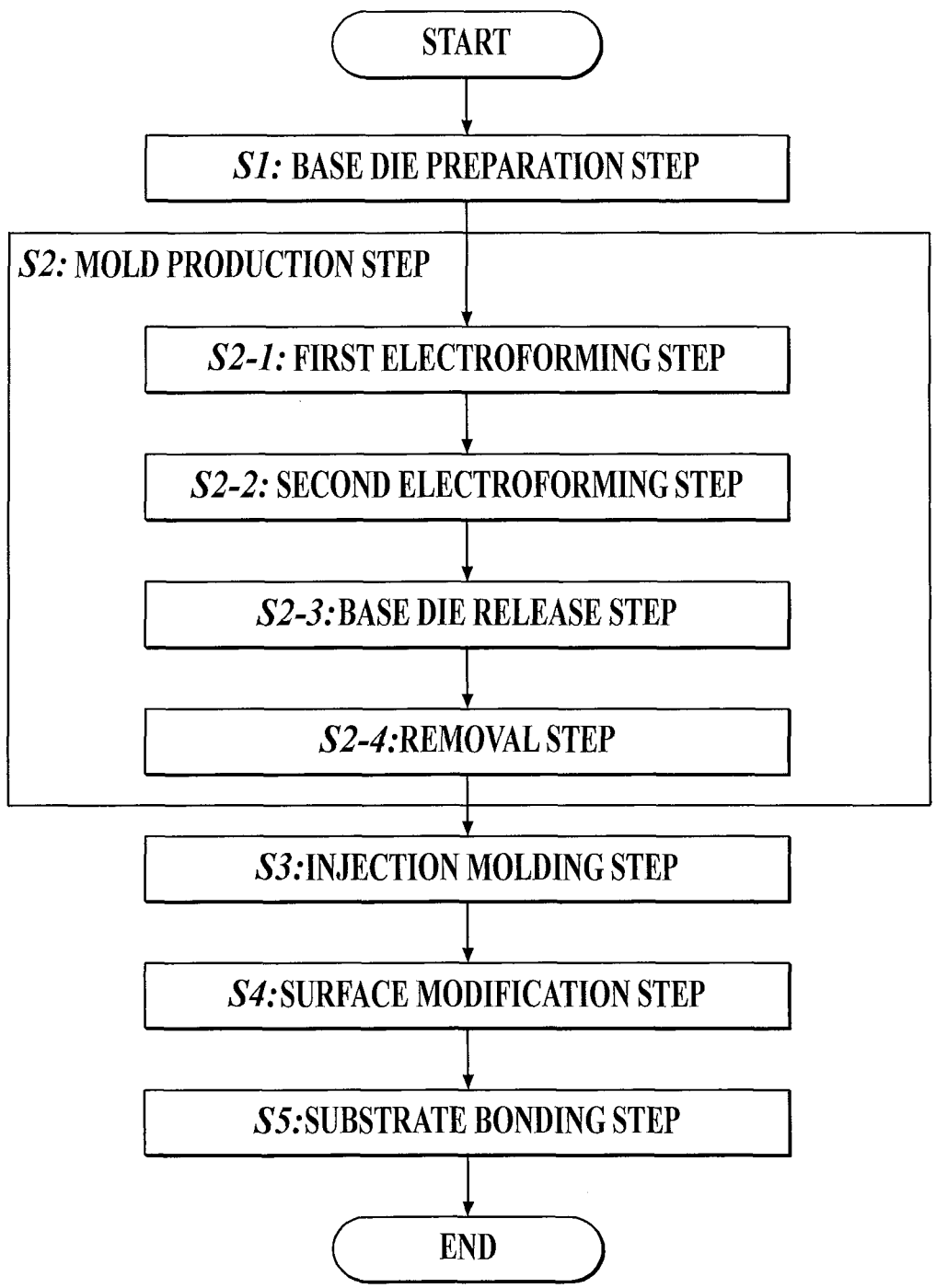

MANUFACTURING METHOD OF RESIN MOLDING MOLD, RESIN MOLDING MOLD, RESIN MOLDING MOLD SET, MANUFACTURING METHOD OF MICROCHIP SUBSTRATE, AND MANUFACTURING METHOD OF MICROCHIP USING SAID MOLD

TECHNICAL FIELD

The present invention relates to a manufacturing method of a resin molding mold, the resin molding mold, a resin molding mold set, a manufacturing method of a microchip substrate and a manufacturing method of a microchip using the mold.

BACKGROUND ART

There have been practically used micro test chips, micro analysis chips or an apparatus called μTAS (Micro Total Analysis Systems) (hereinafter, these are called microchips), wherein a fine structure, a flow path or a circuit is formed on a substrate member by using fine processing technology, and chemical reactions, separation and test such as analysis of a specimen such as a nucleic acid, a protein and blood are conducted in a minute space. Such a microchip has advantage of reducing used amounts of specimens and reagents and discharge amount of waste fluid and achieving a space-saving, portable, and inexpensive analysis system. Recently, it has been required to especially develop resin microchips which are low-cost and relatively easy to waste.

A microchip is manufactured by attaching two substrate members to each other, at least one of which has a fine structure. The fine structure on the substrate member is formed as a flow path groove, a puddle and a through-hole which penetrates the substrate member in the thickness direction. In such microchip, a specimen or a reagent is injected through the through-hole and reaction is made in the flow path groove or the puddle to perform a test.

Among the substrate members of such microchip, the substrate member having the fine structure including the through-hole is produced by injection molding. As an injection molding method of a product having the through-hole, the patent document 1 discloses a technique in which a pin is inserted into an insert of a movable mold piece, the pin is biased toward the movable mold piece by a spring, the tip of the pin sticks to the movable mold piece and injection molding is performed to prevent the generation of flash. As another injection molding method, there is also a method of inserting pins from both sides of the fixed and movable mold pieces to abut the two pins with each other at the central portion of the space in which resin is injected.

On the other hand, though there are various manufacturing methods of a mold, an electroformed mold having a high-accuracy transcription is appropriate for producing a fine structure such as a microchip. The electroformed mold is manufactured by producing a base die at first and performing electroforming on the base die so that metal is electrodeposited thickly. Thereafter, the electrodeposited material is released from the base die to be used as an electroformed mold.

As a material of the mold, nickel, nickel alloy and the like are used. For example, the patent document 2 discloses an electroformed mold obtained by forming an electroplated layer of nickel or cobalt on a base die surface at first and forming a nickel alloy electroformed layer thereon. Further, the patent document 3 discloses a technique of removing the electroplated layer of nickel or cobalt which was formed first by nitric acid aqueous solution. Though having good releasability from the base die, the electroplated layer of nickel or cobalt formed first is soft, and thus the patent document 2 leaves the electroplated layer of nickel or cobalt at the surface be worn out due to repeated use of the mold, whereas the patent document 3 removes the electroplated layer of nickel or cobalt at the surface to expose the hard nickel alloy electroformed layer on the surface.

PRIOR ART DOCUMENTS

Patent Documents

Patent Document 1: Japanese Patent Application Laid Open Publication No. 2004-114334
Patent Document 2: Japanese Patent Application Laid Open Publication No. H6-128788
Patent Document 3: Japanese Patent Application Laid Open Publication No. H6-158381

DISCLOSURE OF THE INVENTION

Problems to be Solved by the Invention

Since specimens and such like are introduced through the through-hole and pass through the fine flow paths to perform a test in the microchip, the through-holes and flow paths need to be produced with high accuracy. That is, when there is an obstacle such as a flash on the portion the specimen and such like flow, the specimen does not flow at a constant speed or the flow is disturbed to make the reaction unstable, and in an extreme case, the flow path is blocked and cannot be used as a microchip.

Though an electroformed mold which can transcribe the shape of the base die with high accuracy is most appropriate for producing a high-accuracy fine structure as represented by the microchip, materials of the electroformed mold have both merits and demerits. For example, though metal such as pure nickel and pure cobalt has a high adhesiveness with regard to the base die, enables high-accuracy transcription and has good releasability from the base die for a low electroforming stress, such metal is soft and easy to be worn out. On the other hand, though being hard, the nickel alloy has a demerit of generating peeling and warp easily during the electrodeposition due to a large electroforming stress.

On the other hand, though there is a method using a pin to form a through-hole by injection molding, positioning without generating a flash at a connection part between a flow path and a through-hole to be formed is very difficult in view of accuracy if an insert is produced next to a convex portion corresponding to the flow path to insert a pin from the bottom side, or a pin is vertically provided from the upper mold piece so that the tip of the pin abuts the end portion of the convex portion.

Further, in a method of using a pin, the pin needs to be pressed strongly against the surface of a facing mold piece, however, if the material is worn out at the abutting surface of the mold surface due to the press, a single mold cannot produce many moldings, which is not economical. Especially, as for the microchip, the through-hole needs to be formed with high accuracy, the pin needs to be pressed against the mold piece more strongly so as not to generate flash or such like, and thus a great strain is put on the abutting surface of the mold piece.

Though a bar member corresponding to the through-hole can be provided vertically from the mold piece without using a pin, it requires considerable long time and not realistic to produce the bar member with a height of covering the thickness of the substrate member of 10 mm or more by electroforming.

As described above, high transcription, accuracy of molding not generating flash and such like at the connection part between flow path and the through-hole and such like and economic efficiency of suppressing the wearing out of the mold to the minimal level are required for a mold piece for molding a microchip having a flow path and a through-hole by injection molding.

However, there has not been suggested a mold piece which meets all the above-mentioned properties in manufacturing the microchip substrate including the through-hole and flow path. Also, patent documents 1 to 3 merely disclose a general configuration of a mold for obtaining a molding which has a through-hole and a general technique regarding an electroformed mold, and do not indicate providing a molding mold of microchip substrate which solves the above problems.

Further, the similar situation exists as for the outer frame portion of the mold. That is, the outer frame portion is what is called a pressing structure in which two mold pieces are pressed against each other by high pressure to prevent the generation of flash, however, high transcription and economic efficiency of suppressing the wearing out of mold to the minimal level are also required for the mold having such pressing structure of outer frame.

Accordingly, an object of the present invention is to provide a manufacturing method of a resin molding mold, the resin molding mold, a resin molding mold set, a manufacturing method of a microchip substrate and a manufacturing method of a microchip using the mold, which are excellent in high-accuracy transcription of a fine structure, accuracy of not generating a flash and economic efficiency with less wearing out.

Means for Solving the Problem

In order to achieve the above object, the inventor adopts a method of forming, on a fine structure forming surface of a mold, a fine structure convex part corresponding to a fine structure and a through-hole, a through-hole corresponding to the outer form or an outer form convex part which is higher than the fine structure convex part and lower than thickness of a substrate member to be molded, and then abutting a pin or an outer frame so as to face the through-hole or the outer shape convex part to perform injection molding. The manufacturing method uses a mold piece obtained by electroforming the fine structure convex part with a first material which has a high adhesiveness with regard to a base die and a low electroforming stress and then electroforming the through-hole or the outer shape convex part with a second material which is hard. Specific examples will be described below.

1. A manufacturing method of a resin molding mold for molding a resin molded body which has a fine structure and at least one of a through-hole and an outer form obtained by a mold pressing structure, including:

preparing a base die which has a first concave part corresponding to the fine structure and a second concave part corresponding to at least one of the through-hole and the outer form and being deeper than the first concave part;

first electroforming with a first material on the base die;

second electroforming with a second material different from the first material over the first material electroformed in the first electroforming; and removing the first material electrodeposited on the second concave part to form a protruding part for forming at least one of the through-hole and the outer form, wherein the first material has a smaller electroforming stress than the second material, the first material has a higher adhesiveness with regard to the base die than the second material and the second material is harder than the first material.

2. The manufacturing method of the resin molding mold according to claim 1, wherein the first material is pure nickel or pure cobalt.

3. The manufacturing method of the resin molding mold according to claim 1 or 2, wherein the second material is nickel alloy.

4. The manufacturing method of the resin molding mold according to claim 3, wherein Vickers hardness of the second material is 400 to 700 HV.

5. A resin molding mold, which is used together with a facing mold, for molding a resin molded body which has a fine structure and at least one of a through-hole and an outer form obtained by a mold pressing structure, the resin molding mold including:

a first electroformed layer which has a first shaping part for molding the fine structure; and a second electroformed layer which has a second shaping part for molding at least one of the through-hole and the outer form, wherein the first electroformed layer is layered on a facing mold side compared to the second electroformed layer, the second shaping part of the second electroformed layer protrudes toward the facing mold and is exposed at least at a surface of the resin molding mold that contacts with the facing mold, and a first material forming the first electroformed layer has a smaller electroforming stress than a second material forming the second electroformed layer, the first material has a higher adhesiveness with regard to the base die than the second material, and the second material is harder than the first material.

6. The resin molding mold according to claim 5, wherein Vickers hardness of the second material is 400 to 700 HV.

7. A resin molding mold set, including:

the resin molding mold according to claim 5 or 6 as a first mold piece; and a second mold piece which forms a molding space with the first mold piece and has, at a position facing the second shaping part of the first mold piece, at least one of a through-hole for inserting a core pin to be pressed against the second shaping part and an outer frame to be pressed against the second shaping part.

8. A manufacturing method of a microchip substrate, including:

using the resin molding mold according to claim 5 or 6, which has the second shaping part for forming the through-hole, as a first mold piece;

placing a second mold piece, which has a core pin through-hole for inserting a core pin, so as to face the first mold piece;

clamping the first and second mold pieces by abutting the core pin against the second shaping part of the first mold piece through the core pin through-hole of the second mold piece; and injecting a molding resin into a molding space provided between the first and second mold pieces.

9. A microchip manufacturing method, including producing a microchip by attaching a second substrate to a first substrate, the first substrate being a microchip substrate manufactured in the manufacturing method according to claim 8.

Effects of the Invention

The above present invention provides a manufacturing method of a resin molding mold, the resin molding mold, a resin molding mold set, a manufacturing method of a microchip substrate and a manufacturing method of a microchip, which are excellent in high-accuracy transcription of a fine structure, accuracy of not generating a flash and economic efficiency with less wearing out.

BRIEF DESCRIPTION OF DRAWINGS

[FIG. 2] This is a process chart showing processes of a manufacturing method of the microchip in the first embodiment of the present invention.

EMBODIMENTS FOR CARRYING OUT THE INVENTION

Figure 1A:
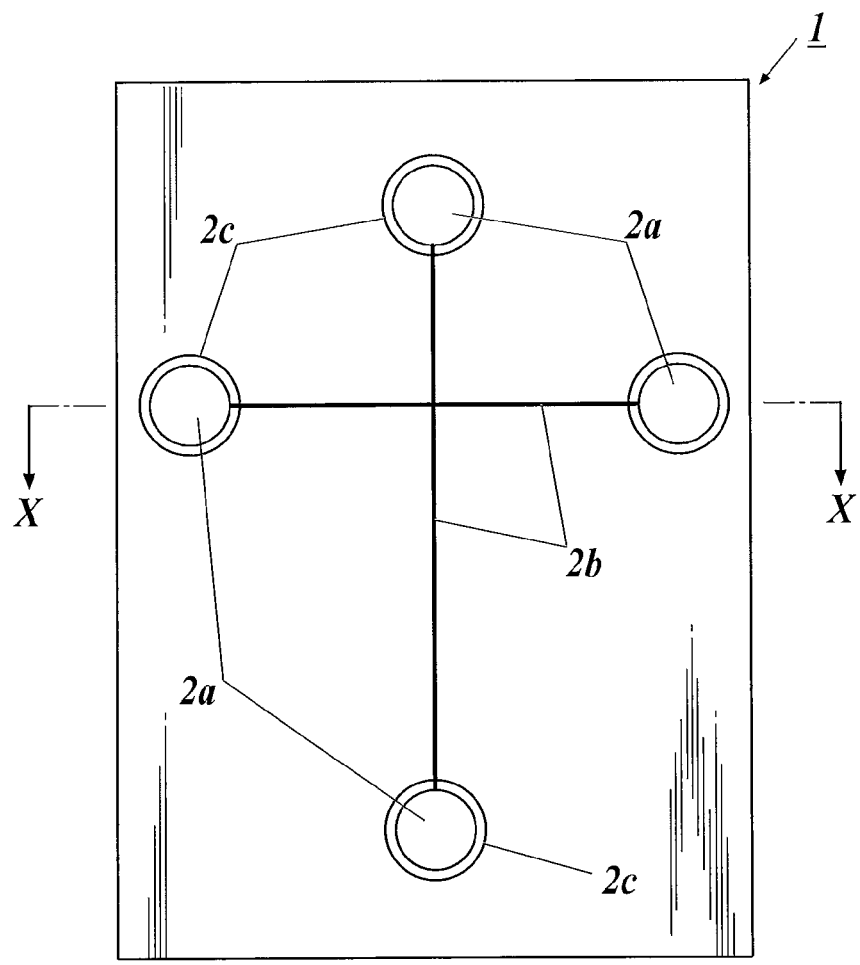
[FIG. 1A] This is a plan view showing a microchip which is manufactured by using a mold of a first embodiment of the present invention.
Figure 1B:
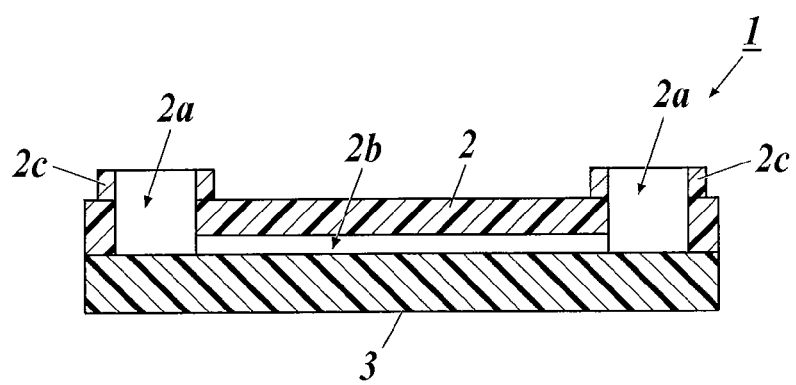
[FIG. 1B] This is a sectional view showing a microchip which is manufactured by using the mold of the first embodiment of the present invention.

Hereinafter, a first embodiment of the present invention will be described with reference to the drawings. FIGS. 1A and 1B are diagrams showing a microchip which is manufactured by using a mold of the first embodiment of the present invention. FIG. 1A is a plan view and FIG. 1B is a sectional view cut along the X-X line.

A microchip 1 in the embodiment is obtained by bonding two substrate members formed of plate members of resin molded body and has through-holes 2a and flow paths 2b. The substrate having the through-holes 2a and the flow paths 2b is called a first substrate 2 and the substrate covering the flow paths is called a second substrate 3. Since the second substrate 3 is an example not producing a fine structure, the second substrate 3 may be a resin film, and not a plate member of a molded body.

The first substrate 2 has four through-holes 2a penetrating therethrough in the thickness direction and flow paths 2b. The flow paths 2b are provided on the bonding surface side to be bonded with the second substrate 3 and include a vertical direction (longitudinal direction) flow path connecting upper and lower through-holes 2a in FIG. 1A and a horizontal direction (lateral direction) flow path connecting left and right through-holes 2a, and the both flow paths intersect each other. The through-holes 2a have protruding parts 2c which protrude from a flat surface (the surface opposite to the surface provided with the flow paths 2b) of the first substrate 2, and tubes and such like can be connected to the protruding parts 2c.

The through-holes 2a are connecting parts between the flow paths 2b and the outside and are holes for performing introduction, storage or discharge of a specimen, reagent, gel or buffer solution and such like (hereinafter, the material to be introduced into the flow paths are called "specimen and such like"). The through-holes 2a may have various shapes including a circle and a rectangular shape. The protruding parts 2c of the through-holes 2a are connected to a tube or a nozzle provided to an analysis device and the specimen and such like are introduced into or discharged from the flow paths 2b via the tube or the nozzle. A priming pump, a syringe pump and such like may be connected to the protruding parts 2c to assist the introduction and discharge of the specimen and such like. Though the through-holes 2a are provided at the end portions of the flow path 2b in FIG. 1 as an example, the through-holes 2a can be provided in the flow paths 2b.

Good moldability (transcriptional property and releasability), high transparency and low autofluorescence property with regard to ultraviolet light and visible light are recited as conditions of resin materials forming the first substrate 2 and the second substrate 3. For example, thermoplastic resin is used for the first substrate 2 and the second substrate 3. As thermoplastic resin, for example, it is preferable to use polycarbonates, polymethyl methacrylate, polystyrene, polyacrylonitrile, polyvinyl chloride, polyethylene terephthalate, nylon 6, nylon 66, polyvinyl acetate, polyvinylidene chloride, polypropylene, polyisoprene, polyethylene, polydimethylsiloxane, cyclic polyolefins and such like. The resins particularly preferred are polymethyl methacrylate and cyclic polyolefins. The first substrate 2 and the second substrate 3 may be formed of the same material or different materials.

The outer shape of the microchip 1 only needs to be a shape that facilitates handling and analysis, and square and rectangles are preferable. The size may be 10 to 200 mm square as an example.

The thickness of each of the first substrate 2 and the second substrate 3 is approximately 0.5 to 10 mm when it is a plate member and approximately 0.01 to 0.5 mm when it is a film member. The thickness of the first substrate 2 and the second substrate 3 may be either same or different.

In consideration of reducing the used amount of the analysis sample and reagent, production accuracy, transcriptional property, releasability and such like of a molding mold, the width and depth of the flow path 2b preferably ranges from 1 to 1000 μm and more preferably ranges approximately 10 to 200 μm. The width and depth of the flow path 2b may be determined depending on usage of the microchip 1. In addition, the flow path 2b may have a rectangular or rounded (at least a part thereof is rounded) cross-section.

Next, an embodiment of the manufacturing method of the microchip will be described. The manufacturing method roughly includes following steps of (S1) to (S5) as shown in FIG. 2.

(S1) Prepare a base die of a substrate (base die preparation step)

(S2) Produce a mold of the substrate by using the base die (mold production step)

(S2-1) Electroform with a first material (first electroforming step)

(S2-2) Electroform with a second material (second electroforming step)

(S2-3) Release the electroformed mold from the base die (base die release step)

(S2-4) Remove the first material corresponding to through-holes (removal step)

(S3) Perform injection molding of the substrate (injection molding step)

(S4) Perform surface modifying processing (surface modification step)

(S5) Bond two substrates (substrate bonding step)

Hereinafter, the steps will be described in order.

[S1: Base Die Preparation Step]

In the embodiment, the base die is prepared by producing it. In a case where there is already a produced base die, it is not necessary to produce another base die and only the produced base die needs to be prepared. As the material of the base die, conductive material formed of metal such as tool steel and non-conductive material such as plastic can be used. In a case of the conductive material, the surface is plated with nickel and phosphorus and the fine structure such as a flow path is produced by cutting the surface plated with nickel and phosphorus with a micromachine. In a case of the non-conductive material, the fine structure is produced by photolithography and electroless plating of nickel and such like is performed on the surface to provide conductivity. Extraneous matters are removed from the produced base die by purified water cleaning and plasma irradiation is performed as needed so as to increase the releasability.

[S2: Mold Production Step]

In the mold production step, first electroforming step S2-1 of electroforming on a base die with a first material, second electroforming step S2-2 of further electroforming on the surface thereof with a second material, base die release step S2-3 of releasing the electroformed mold from the base die and removal step S2-4 of removing the first material on the convex portion corresponding to the through-holes $2a$ are performed. Also, a back-up material may be provided on the back surface of the electroformed mold piece for reinforcement as needed.

As the first material, pure nickel and pure cobalt which have high transcriptional property are used. Having a low electroforming stress, the pure nickel and pure cobalt can fit to the base die and accurately transcribe the shape thereof.

As the second material, alloy such as nickel alloy and cobalt alloy which is harder than the first material is used. Specifically, nickel-phosphorus alloy, nickel-tungsten alloy, nickel-cobalt alloy, nickel-iron alloy, nickel-chromium alloy, cobalt-phosphorus alloy, cobalt-tungsten alloy, cobalt-iron alloy, cobalt-chromium alloy and such like are used. For example, pure nickel has Vickers hardness of 200 to 250 HV whereas nickel alloy has high hardness of 400 to 700 HV in Vickers hardness. The second material has an electroforming stress larger than that of the first material and can cause peeling or warp when directly electroformed on the base die, however, by electroforming the base die with the first material at first and electroforming with the second material thereon, adhesiveness of them is improved and the second material can also be formed (electroformed) well. Also, since the core pin material to be pressed by the second material portion has Vickers hardness of approximately 600 to 800 HV, by appropriately selecting nickel alloy, the wearing out of the electroformed member can be suppressed.

Figure 3A:
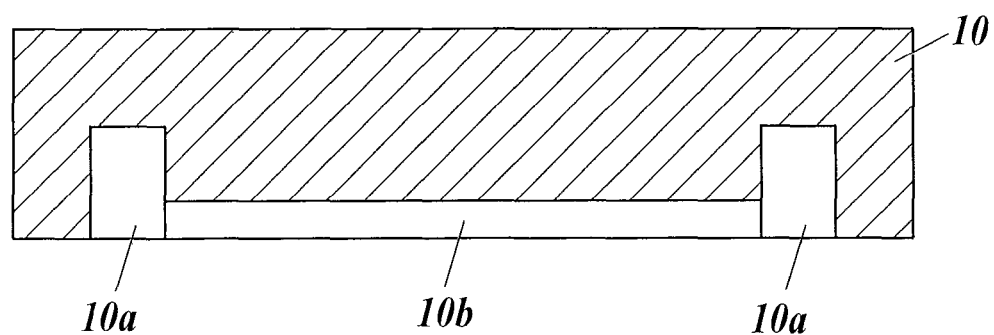
[FIG. 3A] This is a diagram showing a manufacturing process of an electroformed mold.

FIGS. 3A to 3D are diagrams showing a manufacturing process of an electroformed mold 13 in the mold producing step. FIG. 3A is a diagram showing a base die 10 having concave parts (second concave parts) $10a$ for forming aftermentioned protruding parts $13a$ (see FIG. 4) corresponding to the through-holes $2a$ and a concave part (first concave part) $10b$ corresponding to the flow path $2b$. The concave parts $10a$ are deeper than the concave part $10b$.

Figure 3B:
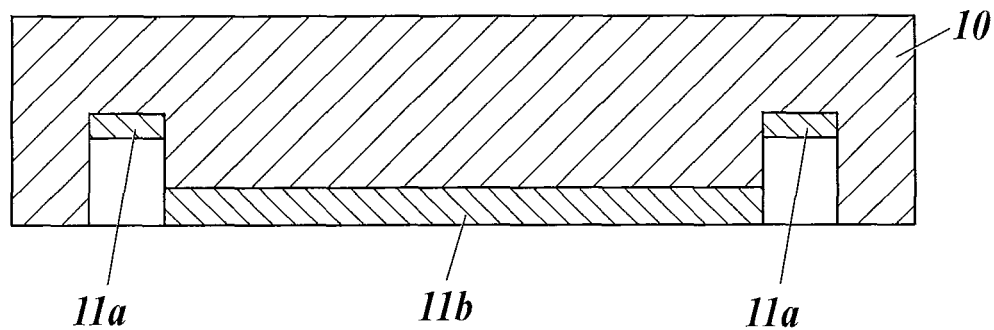
[FIG. 3B] This is a diagram showing a manufacturing process of the electroformed mold.

Next, in the first electroforming step of FIG. 3B, the first material is electroformed in the concave parts $10a$ and $10b$ to form a first electroformed layer 11. The first electroformed layer 11 is formed of electroformed layers $11a$ electrodeposited at the bottom of the concave parts $10a$ and an electroformed layer $11b$ electrodeposited in the concave part $10b$. The electroformed layer $11b$ is a shaping part (first shaping part) for molding the flow path $2b$. Though not shown in the drawings, the first material is also thinly electrodeposited on inner side surfaces of the concave parts $10a$. However, the first material electrodeposited on the inner side surfaces does not have a bad effect as mentioned later. The electroforming is performed for at least a period of time until the concave part $10b$ corresponding to the flow path $2b$ is filled.

Figure 3C:
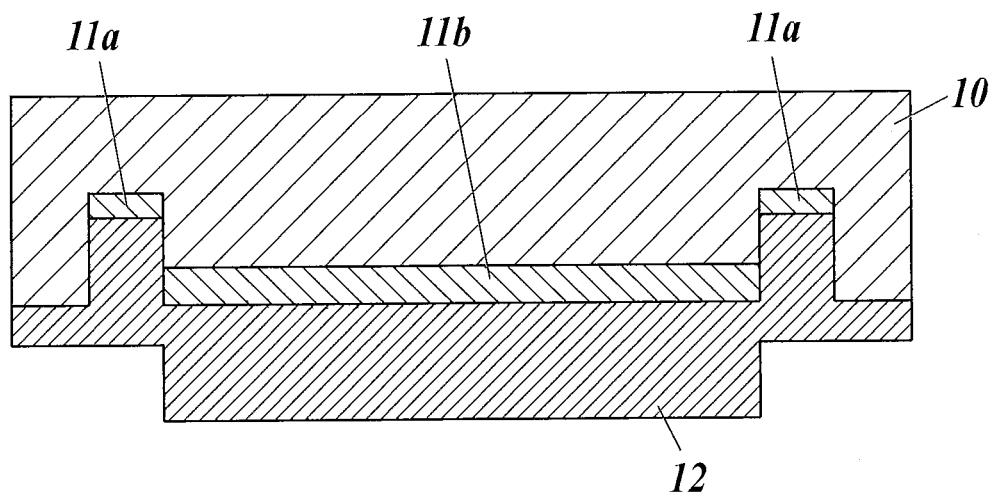
[FIG. 3C] This is a diagram showing a manufacturing process of the electroformed mold.
Figure 3D:
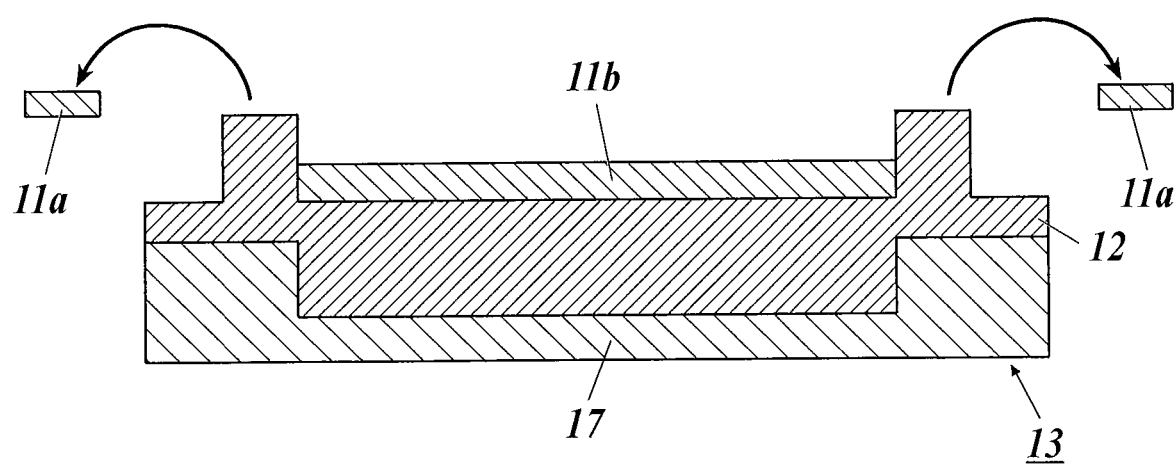
[FIG. 3D] This is a diagram showing a manufacturing process of the electroformed mold.

In the following second electroforming step of FIG. 3C, a second electroformed layer 12 is formed on the first electroformed layer 11 with the second material. Thus, the first electroformed layer 11 is layered on a facing mold (aftermentioned movable mold piece 14) side compared to the second electroformed layer 12, and the second electroformed layer 12 has a shaping part (second shaping part) for molding the through-holes $2a$. The electroforming is performed for at least a period of time until the concave parts $10a$ are filled. Then, as shown in FIG. 3D, the base die 10 is removed to form an electroformed mold 13. When the mold needs to be thick or manufacturing is to be performed in a shorter time, as shown in FIG. 3D, a back-up layer 17 maybe formed on the back surface of the electroformed mold 13. Though it is preferable that the back-up layer 17 is a plate which is harder than the electroforming material and strong, the material thereof is not especially limited and various types can be used. For bonding between the back-up layer 17 and the electroforming material (electroformed mold 13), various methods such as adhesion, welding adhesion, welding, electrodeposition and bolt fixation can be used.

Finally, the first material $11a$ corresponding to the through-holes $2a$ is removed. On removal, masking is performed on a portion other than portions corresponding to the through-holes $2a$ and the first material is removed by a cutting machine to expose the second material. Thus, the shaping parts of the second electroformed layer 12 for molding the through-holes $2a$ protrude toward the facing mold and are exposed at least at the surface of the electroformed mold 13, the surface contacting with the facing mold. Here, though the first material is also electroformed on the inner side surfaces of the concave parts $10a$, this is not especially a problem because the second material is electrodeposited therein (inner sides) and the protruding parts are hard as a whole.

Figure 4:
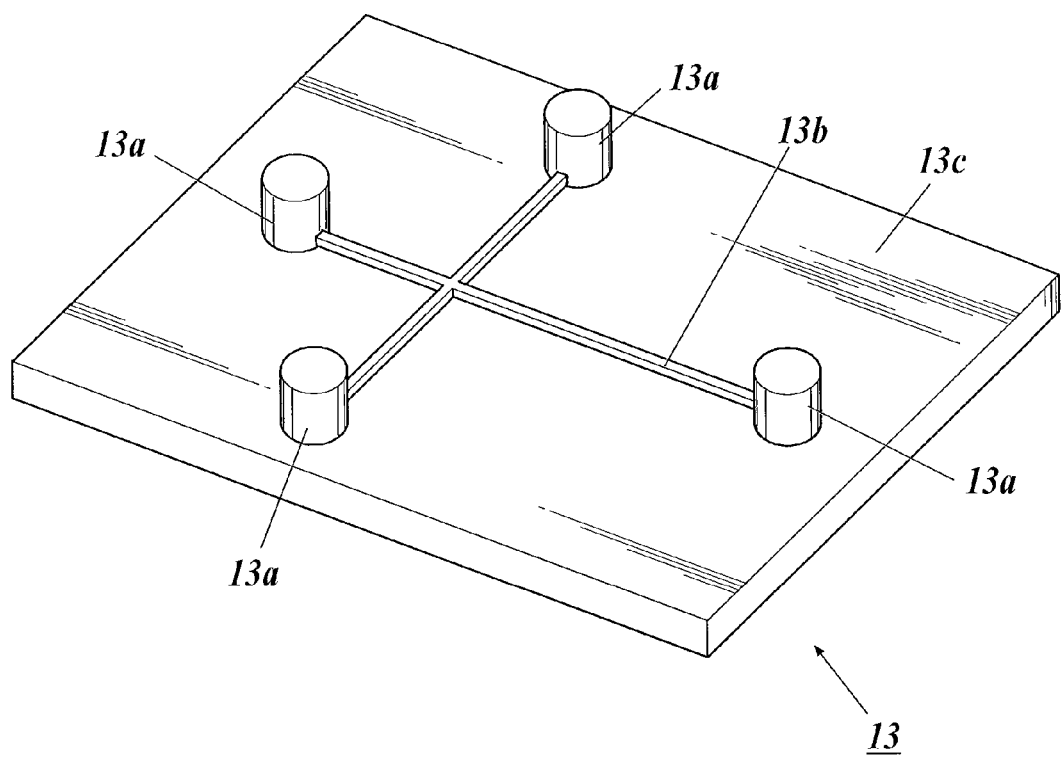
[FIG. 4] This is a perspective view of a microchip electroformed mold of the first embodiment.

FIG. 4 shows the electroformed mold 13 produced as described above. In FIG. 4, the protruding part $13b$ corresponding to the flow paths $2b$ is formed of the first material and the protruding parts $13a$ corresponding to the through-holes $2a$ are formed of the hard second material.

[S3: Injection Molding Step]

Figure 5:
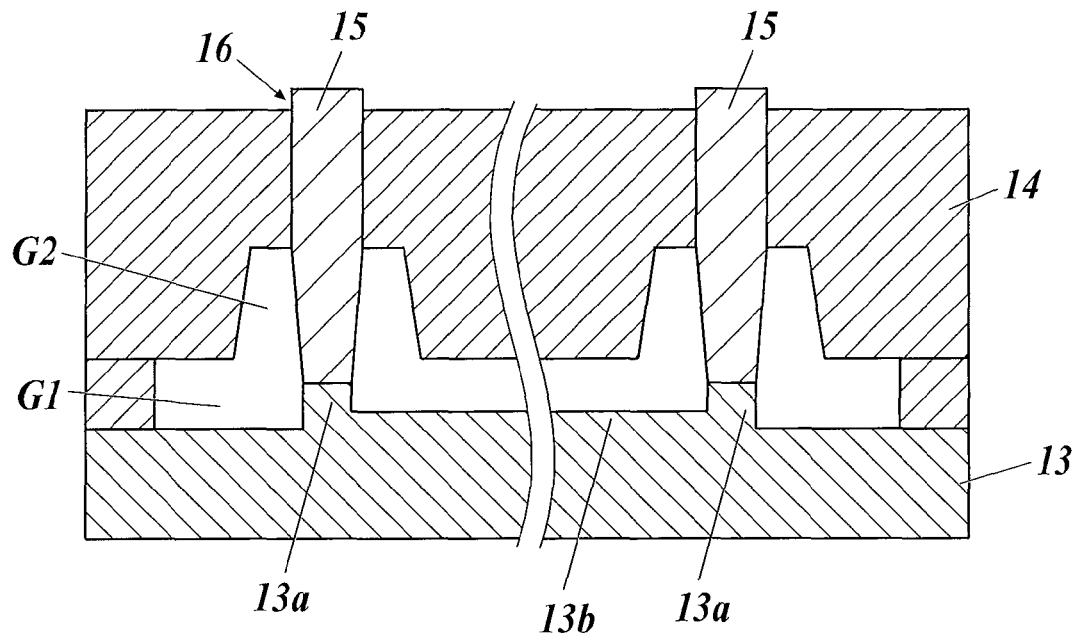
[FIG. 5] This is a sectional view showing a state where the electroformed mold is clamped in an injection molding process.

In the injection molding step, the electroformed mold 13 produced in the above mold producing step is used to produce the first substrate 2 via mold clamping step, injection step, cooling step, mold opening step and removal. FIG. 5 shows a state of the cross-section surface of the mold set when the mold clamping step in the injection molding step ends. In FIG. 5, the mold 13 is schematically shown as a unit including the protruding parts 13a and 13b.

In FIG. 5, a fixed mold piece 13 is the electroformed mold 13 which is produced in the above mold producing step and has the protruding parts 13a corresponding to the through-holes 2a which expose the second material at the surfaces, and has the protruding part 13b corresponding to the flow paths parts and made of the first material. A movable mold piece 14 located so as to face the fixed mold piece 13 with a predetermined distance therebetween has holes (through-holes for core pins) 16 to insert core pins 15 and a space part G1 for forming a flat portion of the first substrate and a concave space part G2 for forming the protruding parts 2c of the through-holes 2a are formed between the movable mold piece 14 and the fixed mold piece 13. As the core pin 15, various materials such as a hard tool steel can be used, and for example, a material classified into molybdenum series high-speed tool steel by JIS, specifically, a material such as SKH-51 and SKH-55 in JIS mark can be used. The SKH-51 has hardness of approximately 800 HV after tempering.

The core pins 15 are positioned so as to just contact the protruding parts 13a produced with the second material and are pressed with a biasing member which is not shown in the drawings. In such way, the injection molding mold set of microchip substrate is formed of the fixed mold piece 13, the movable mold piece 14 and the core pins 15. They are assembled to clamp the fixed mold piece 13 and the movable mold piece 14, resin to form the first substrate 2 is injected to be filled in the molding space provided between the fixed mold piece 13 and the movable mold piece 14, and after cooling, the mold pieces are opened to remove the resin. Thus, the first substrate 2 is produced. The second substrate 3 may be produced by injection molding as similarly to the first substrate 2 or by stretching or such like. A commercially available resin plate member or a film may be used.

[S4: Surface Modification Step]

When the two substrates are formed, surface modification processing is performed on the bonding surface therebetween. Though not always needed, the surface modification processing can make the bonding stronger in the following bonding step. The surface modification processing is effective especially since the polyethylene and polypropylene with small polarity have a small bonding force.

The surface modification processing can be performed by energy radiation processing such as excimer laser irradiation, plasma discharge and corona discharge. Such energy radiation activates the substrate surface and improves the bonding property.

[S5: Substrate Bonding Step]

The substrate bonding step is a step of bonding two substrates. The bonding method includes thermal bonding, laser bonding, ultrasonic bonding, bonding by adhesion and bonding by organic solvent.

All of the thermal bonding, laser bonding and ultrasonic bonding melt the resin by heating and solidify it by cooling, and can be applied in a case where the resin material is thermoplastic resin.

In the thermal bonding, a hot press is used to sandwich the first substrate 2 and the second substrate 3 between heated plates, pressure is applied by the heated plates holding the substrates for a predetermined period of time, and thereby the substrates are bonded. A hot roll can be used in place of the hot press.

In the laser bonding, heating is performed by the laser beam and the laser beam is focused on the bonding surface to perform laser scanning. The laser beam is focused to melt the resin material on the bonding surface and the two substrates are bonded. Some resin materials originally include a component absorbing laser beam, and when one of the resins has characteristic of absorbing a light equivalent to a wavelength of the laser to be used, the resin heats at the bonding surface by itself, and thus the light focusing to the bonding surface is not necessary. Also, in a case of a resin material not including a laser beam absorbing component, the heating by laser beam may be performed in a method of dispersing light-absorbing pigment which absorbs laser beam on at least one of the substrate members or in a method of applying light absorbent to a portion (other than neighborhood of electrodes) where the two resin substrates are bonded. The laser strength is approximately 0.1 to 20 W, for example.

In the ultrasonic bonding, strong frictional heat is generated on the bonding surface by fine ultrasonic vibration and pressure application, and the resin is melted to be bonded. In the ultrasonic bonding, vibrator formed of a piezoelectric element is vibrated fast, the vibration energy is applied to the superimposed first and second substrates 2 and 3 with pressure via a resonator called horn and thereby frictional heat is generated on the bonding surface to weld the bonding surface for an extremely short time. For example, ultrasonic frequency may be approximately 10 to 50 kHz, and the welding time can be a second or shorter.

In the step of the bonding by adhesion or the bonding by organic solvent, respectively, adhesion or organic solvent is applied to the two substrates to bond them. The adhesion and the organic solvent to be used are appropriately selected according to the types of the substrate material. The bonding by adhesion or organic solvent is effective when using thermosetting resin or such like for which the above thermal bonding cannot be used.

Figure 6:
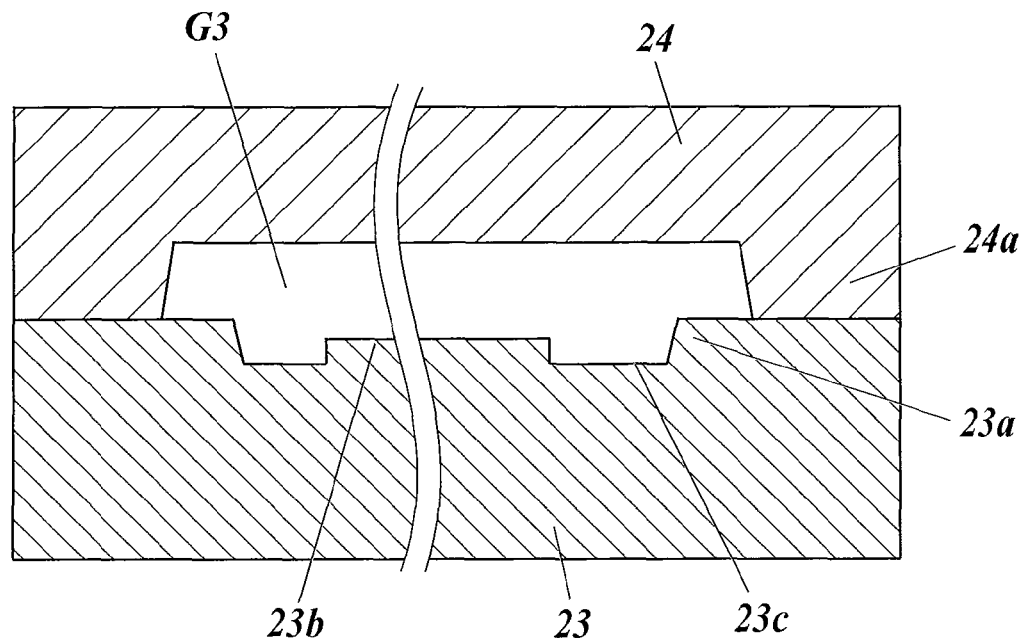
[FIG. 6] This is a sectional view showing a state where an electroformed mold is clamped in a second embodiment of the present invention.

FIG. 6 is a sectional view showing a mold clamped state of a mold in a second embodiment in which the present invention is applied to the pressing structure of outer form. In FIG. 6, the fixed mold piece 23 is the electroformed mold 23 which is formed according to the above mold producing step, and has protruding parts (pressing structure) 23a corresponding to the outer form of the substrate as a resin molded body (not shown in the drawings) and exposing the second material at the surface, depressed parts 23c corresponding to the convex parts provided on one surface side (surface bonding with the other substrate, for example) of the substrate and made of the first material, and a protruding part 23b corresponding to a fine structure portion of the one surface and made of the first material. The movable mold piece 24 to be located so as to face the fixed mold piece 23 with a predetermined distance therebetween has an outer frame 24a to be pressed against the protruding parts 23a, and forms a space part G3 for forming a substrate between the movable mold piece 24 and the fixed mold piece 23. In the drawing, the fixed mold piece 23 is schematically shown as a unit including the protruding parts 23a and 23b. The mold of the second embodiment is also produced according to the above-mentioned producing method and the portions to be strongly pressed against the outer frame are made of the second material which is hard.

Figure 7A:
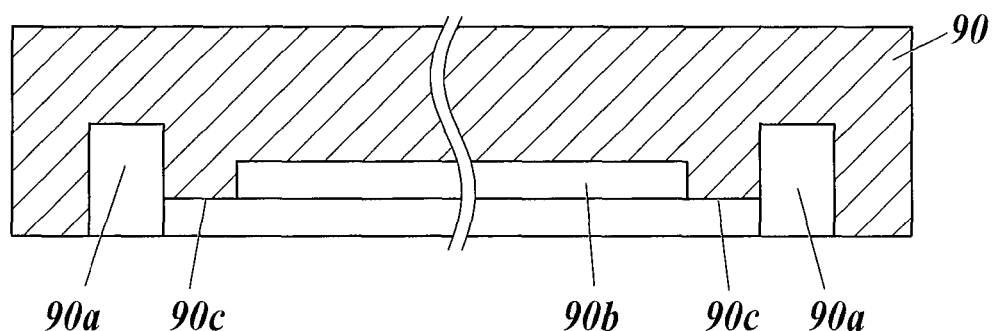
[FIG. 7A] This is a diagram showing a manufacturing process of the electroformed mold.

FIGS. 7A to 7F are drawings showing producing processes of the electroformed mold 23 according to the above mold producing steps. FIG. 7A is a drawing showing a base die 90 and includes concave parts (second concave parts) 90a to form the protruding parts 23a to correspond to the outer frame of the substrate, convex parts 90c for forming the depressed parts 23c corresponding to the convex parts provided on one surface side (surface bonding with the other substrate, for example) of the substrate and a concave part (first concave part) 90b for forming the protruding part 23b corresponding to the fine structure portion such as a flow path. The concave parts 90a are deeper than the concave part 90b.

Figure 7B:
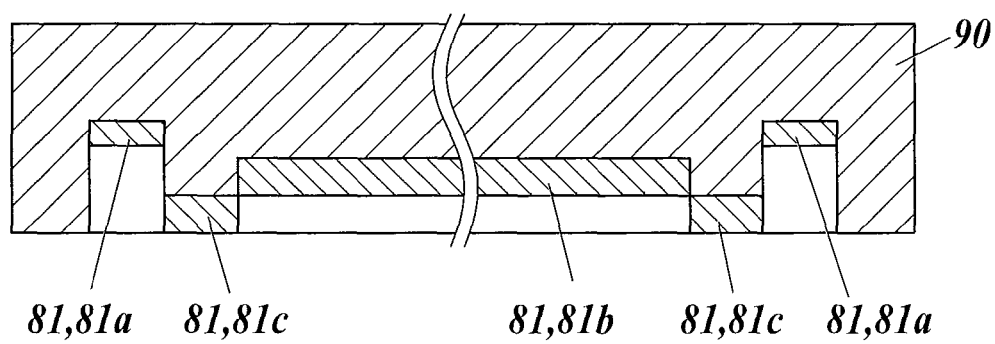
[FIG. 7B] This is a diagram showing a manufacturing process of the electroformed mold.

Next, in the first electroforming step of FIG. 7B, the first material is electroformed inside the base die 90 to form a first electroformed layer 81. The first electroformed layer 81 is formed of electroformed layers 81a electrodeposited at the bottoms of the concave parts 90a, an electroformed layer 81b electrodeposited at the concave part 90b and electroformed layers 81c electrodeposited at the convex parts 90c. The electroformed layer 81b is a shaping part (first shaping part) for molding the fine structure portion of the substrate. Though not shown in the drawings, the first material is also electrodeposited on the inner side surfaces of the concave parts 90a. However, the first material electrodeposited there does not have bad effect as described later. The electroforming is performed for at least a period of time until the concave part 90b corresponding to the fine structure portion is filled.

Figure 7C:
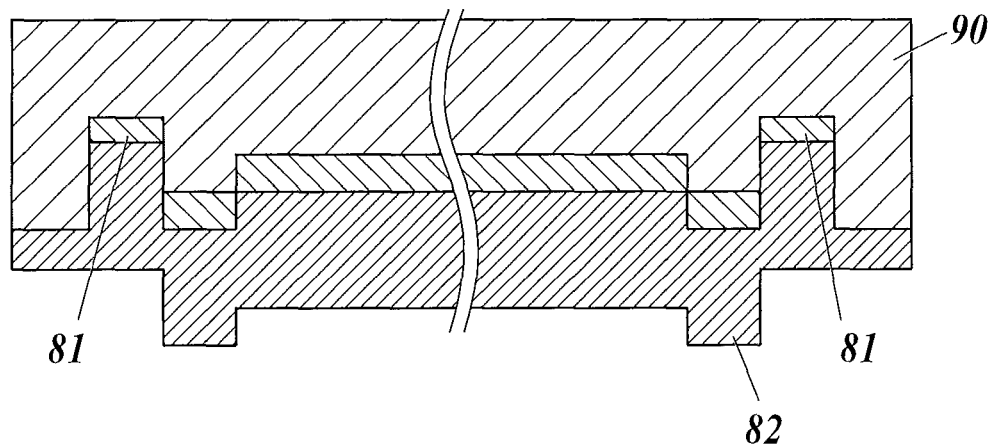
[FIG. 7C] This is a diagram showing a manufacturing process of the electroformed mold.
Figure 7D:
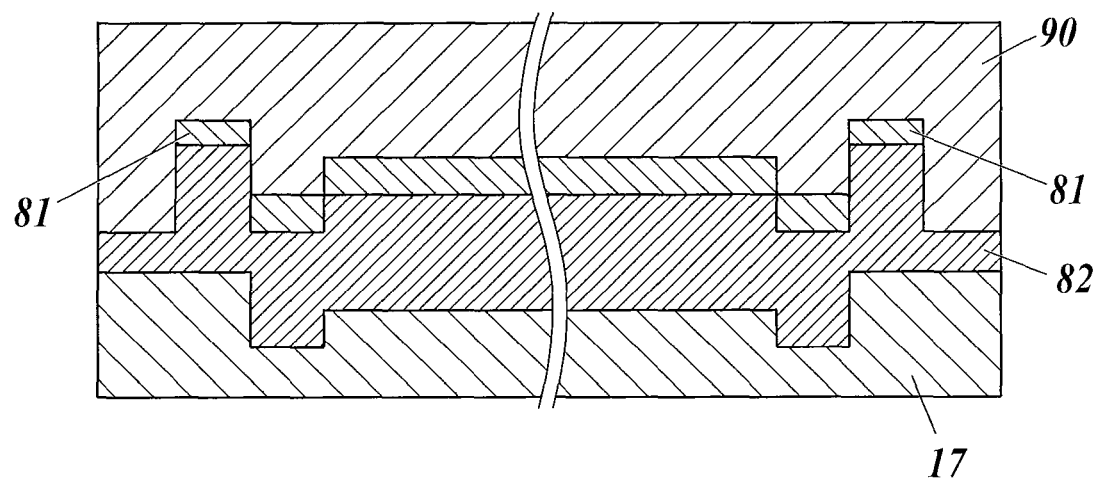
[FIG. 7D] This is a diagram showing a manufacturing process of the electroformed mold.
Figure 7E:
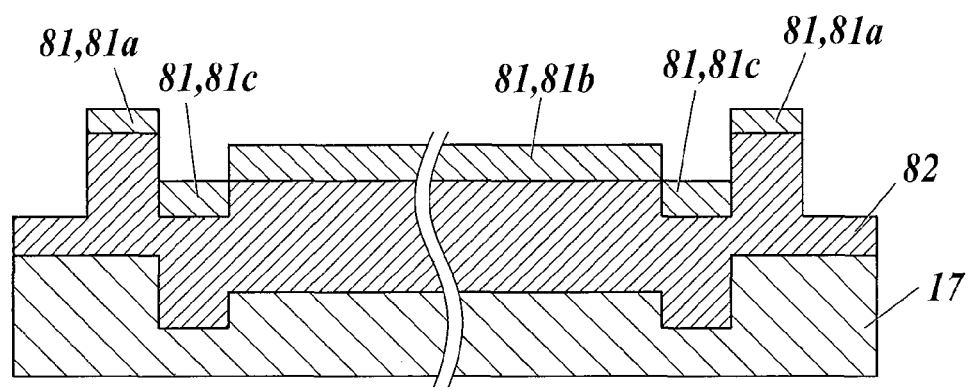
[FIG. 7E] This is a diagram showing a manufacturing process of the electroformed mold.

In the following second electroforming step of FIG. 7C, the second electroformed layer 82 is formed with the second material on the first electroformed layer 81. Thus, the first electroformed layer 81 is layered on the facing mold side compared to the second electroformed layer 82 and the second electroformed layer 82 has a shaping part (second shaping part) for molding the outer frame of the substrate. The electroforming is performed for at least a period of time until the concave parts 90a are filled. Then, as shown in FIGS. 7D and 7E, after providing a back-up layer 17 on the back surface of the electroformed layer 23 (second electroformed layer 82) as needed, the base die 90 is removed.

Figure 7F:
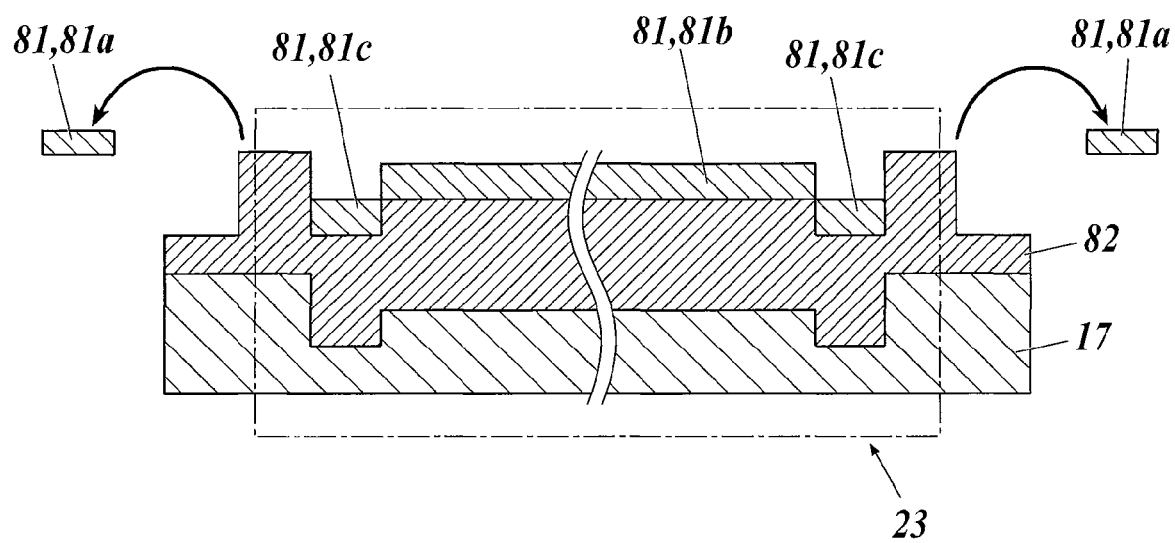
[FIG. 7F] This is a diagram showing a manufacturing process of the electroformed mold.

Finally, as shown in FIG. 7F, by removing the first material 81a corresponding to the outer frame of the substrate (see dashed line in the drawing), the electroformed mold 23 is obtained (the portion inside the dashed line of FIG. 7F is equivalent to the electroformed mold 23 in FIG. 6). When removing the first material 81a, the first material is removed by a cutting machine after masking the portion other than the portion corresponding to the outer form, and the second material is exposed. Thus, in the second electroformed layer 82, the shaping part for molding the outer frame of the substrate protrudes toward the facing mold, and is exposed at least at the surface of the electroformed mold 23 that contacts with the facing mold. Here, though the first material is electroformed also on the inner side surfaces of the concave parts 90a, this is not especially a problem since the second material is electrodeposited therein (inside) to make the protruding parts hard as a whole.

EXAMPLE 1

Next, specific examples of the above-mentioned embodiments will be described.

In the example, as shown in FIG. 4, an electroformed mold configured by forming four through-hole protruding parts and two intersecting flow path protruding parts which join the four protruding parts was produced in the following procedure. First, a base die which has concave parts corresponding to the through-hole protruding parts and the flow path protruding parts is prepared. As the base die, a die obtained by plating the surface of STAVAX with nickel and phosphorus is used. The concave parts of the base die are formed by precision work using a working tool, and the parts corresponding to the flow paths (equivalent to the reference numeral 2b of FIGS. 1A and 1B) is 30 μm in width and 30 μm in depth and the parts corresponding to the through-holes (equivalent to the reference numeral 2a of FIGS. 1A and 1B) are 2 mm in inner diameter and 100 μm in depth. Pure nickel as the first material is electroformed in the base die in thickness of 30 μm by nickel sulfamate bath. Next, in a similar way, nickel-cobalt alloy (mass ratio of nickel to cobalt is 75:25) as the second material is electroformed in thickness of 100 μm by nickel sulfamate bath. The electroformed mold which is produced with the first material and the second material are removed from the base die and a back-up layer (equivalent to the reference numeral 17 of FIG. 3D) by epoxy resin is formed on the back surface. Then, the first material is removed by a cutting machine after masking the portion other than the through-hole corresponding parts of the electroformed mold to expose the second material at the distal end of the through-hole corresponding parts.

A first substrate for microchip including two intersecting flow path grooves and four through-holes is produced by injection molding by using the electroformed mold which was produced as mentioned above, a second mold (movable mold piece) which is to face the electroformed mold and made of preharden type plastic mold steel (NAK 55 manufactured by Daido Steel Co.) and core pins made of molybdenum series high-speed tool steel SKH-51 to be inserted into holes (equivalent to the reference numeral 16 of FIG. 5) of the second mold provided at a position facing the through-hole protruding parts (equivalent to the reference numeral 13a of FIG. 4) of the electroformed mold. The polymethylmethacrylate (acrylic resin, made by Asahi Kasei, Delpet 70NH) of transparent resin material is used as the material of first substrate. As for the first substrate, the outer size is width 30 mm×width 20 mm×thickness 1 mm in a plate shape, the flow path is 30 μm in width and 30 μm in depth, and the through-hole is 2 mm in inner diameter.

As the second substrate to be attached to the first substrate, a plate member which is made of polymethylmethacrylate (acrylic resin, made by Asahi Kasei, Delpet 70NH) and width 30 mm×width 20 mm×thickness 1 mm in outer size is prepared.

The produced first substrate and second substrate are overlapped to be bonded to each other, and in this state, the hot press is used to sandwich the first substrate and the second substrate between hotplates heated to 82 degrees Celsius of press temperature. Pressure of 3.72 MPa is applied, the substrates are held for 30 seconds, and thereby the first substrate and the second substrate are bonded to produce the microchip.

The flow paths and the through-hole portions of the produced microchip were observed through a microscope, and it was found no flash as an obstacle was generated. Also, colored reagent was introduced through the through-hole to observe if there was any disturbed flow of the liquid, and the liquid was found to flow successfully and uniformly.

Ten thousand of the first substrates were produced with the above electroformed mold and flash generation of the microchip was visually confirmed and presence or absence of the disturbed flow of the liquid was confirmed for every 1000 first substrates. The generation of them was not confirmed for the amount of the ten thousand, and thus high-accuracy microchips were able to be manufactured.

The entire disclosure of Japanese Patent Application No. 2011-58650 filed on Mar. 17, 2011 including description, claims, drawings, and abstract are incorporated herein by reference in its entirety.

Industrial Applicability

As described above, the present invention is appropriate for a manufacturing method of a resin molding mold, the resin molding mold, a resin molding mold set, a manufacturing method of a microchip substrate and a manufacturing method of a microchip using the mold which are excellent in high-accuracy transcription of a fine structure, accuracy of not generating a flash and economic efficiency with less wearing out.

Explanation Of Reference Numerals
- 1 microchip
- 2 first substrate
- 2a through-hole
- 2b flow path
- 2c protruding part
- 3 second substrate
- 10 base die
- 10a, 10b concave part
- 11 first electroformed layer
- 12 second electroformed layer
- 13, 23 electroformed mold, fixed mold piece
- 13a, 13b, 23a and 23b protruding part
- 14, 24 movable mold piece
- 15 core pin

The invention claimed is:

1. A manufacturing method of a resin molding mold for molding a resin molded body which has a fine structure and at least one of a through-hole and an outer form obtained by a mold pressing structure, comprising:
preparing a base die which has a first concave part corresponding to the fine structure and a second concave part corresponding to at least one of the through-hole and the outer form and being deeper than the first concave part;
first electroforming with a first material on the base die;
second electroforming with a second material different from the first material over the first material electroformed in the first electroforming; and
removing the first material electrodeposited on the second concave part to form a protruding part for forming at least one of the through-hole and the outer form,
wherein
the first material has a smaller electroforming stress than the second material, the first material has a higher adhesiveness with regard to the base die than the second material and the second material is harder than the first material.

2. The manufacturing method of the resin molding mold according to claim 1, wherein the first material is pure nickel or pure cobalt.

3. The manufacturing method of the resin molding mold according to claim 2, wherein the second material is nickel alloy.

4. The manufacturing method of the resin molding mold according to claim 3, wherein Vickers hardness of the second material is 400 to 700 HV.

5. The manufacturing method of the resin molding mold according to claim 1, wherein the second material is nickel alloy.

6. The manufacturing method of the resin molding mold according to claim 5, wherein a Vickers hardness of the second material is 400 to 700 HV.

7. A resin molding mold, which is used together with a facing mold, for molding a resin molded body which has a fine structure and at least one of a through-hole and an outer form obtained by a mold pressing structure, the resin molding mold comprising:
a first electroformed layer which has a first shaping part for molding the fine structure; and
a second electroformed layer which has a second shaping part for molding at least one of the through-hole and the outer form,
wherein
the first electroformed layer is layered on a facing mold side compared to the second electroformed layer,
the second shaping part of the second electroformed layer protrudes toward the facing mold and is exposed at least at a surface of the resin molding mold that contacts with the facing mold, and
a first material forming the first electroformed layer has a smaller electroforming stress than a second material forming the second electroformed layer, the first material has a higher adhesiveness with regard to the base die than the second material, and the second material is harder than the first material.

8. The resin molding mold according to claim 7, wherein Vickers hardness of the second material is 400 to 700 HV.

9. A resin molding mold set, comprising:
the resin molding mold according to claim 8 as a first mold piece; and
a second mold piece which forms a molding space with the first mold piece and has, at a position facing the second shaping part of the first mold piece, at least one of a through-hole for inserting a core pin to be pressed against the second shaping part and an outer frame to be pressed against the second shaping part.

10. A manufacturing method of a microchip substrate, comprising:
using the resin molding mold according to claim 8, which has the second shaping part for forming the through-hole, as a first mold piece;
placing a second mold piece, which has a core pin through-hole for inserting a core pin, so as to face the first mold piece;
clamping the first and second mold pieces by abutting the core pin against the second shaping part of the first mold piece through the core pin through-hole of the second mold piece; and
injecting a molding resin into a molding space provided between the first and second mold pieces.

11. A microchip manufacturing method, comprising producing a microchip by attaching a second substrate to a first substrate, the first substrate being a microchip substrate manufactured in the manufacturing method according to claim 10.

12. A resin molding mold set, comprising:
the resin molding mold according to claim 7 as a first mold piece; and
a second mold piece which forms a molding space with the first mold piece and has, at a position facing the second shaping part of the first mold piece, at least one of a through-hole for inserting a core pin to be pressed against the second shaping part and an outer frame to be pressed against the second shaping part.

13. A manufacturing method of a microchip substrate, comprising:
using the resin molding mold according to claim 7, which has the second shaping part for forming the through-hole, as a first mold piece;
placing a second mold piece, which has a core pin through-hole for inserting a core pin, so as to face the first mold piece;

clamping the first and second mold pieces by abutting the core pin against the second shaping part of the first mold piece through the core pin through-hole of the second mold piece; and injecting a molding resin into a molding space provided between the first and second mold pieces.

14. A microchip manufacturing method, comprising producing a microchip by attaching a second substrate to a first substrate, the first substrate being a microchip substrate manufactured in the manufacturing method according to claim 13.

* * * * *